United States Patent [19]
Grochowski et al.

[11] Patent Number: 5,442,756
[45] Date of Patent: Aug. 15, 1995

[54] BRANCH PREDICTION AND RESOLUTION APPARATUS FOR A SUPERSCALAR COMPUTER PROCESSOR

[75] Inventors: Edward T. Grochowski, San Jose; Donald B. Alpert, Santa Clara; Jack D. Mills, Mountain View, all of Calif.; Uri C. Weiser, Haifa, Israel

[73] Assignee: Intel Corporation, Santa Clara, Calif.

[21] Appl. No.: 922,855

[22] Filed: Jul. 31, 1992

[51] Int. Cl.⁶ ............................................. G06F 9/38
[52] U.S. Cl. ................................. 395/375; 395/250; 395/800; 364/261.7; 364/239.4; 364/DIG. 1; 364/231.8
[58] Field of Search ................ 395/375, 800, 250

[56] References Cited

U.S. PATENT DOCUMENTS

| | | |
|---|---|---|
| 4,442,484 | 4/1984 | Childs, Jr. et al. |
| 4,725,947 | 2/1988 | Shonai et al. |
| 4,777,587 | 10/1988 | Case et al. |
| 4,847,753 | 7/1989 | Matsuo et al. |
| 4,864,493 | 9/1989 | Kishi |
| 4,876,639 | 10/1989 | Mensch, Jr. |
| 4,881,170 | 11/1989 | Morisada |
| 4,926,323 | 5/1990 | Baror et al. |
| 4,974,154 | 11/1990 | Matsuo ............... 395/375 |
| 5,127,091 | 6/1992 | Boufarah et al. ....... 395/375 |
| 5,214,770 | 5/1993 | Ramanujan et al. |
| 5,226,130 | 7/1993 | Favor et al. |
| 5,265,213 | 11/1993 | Weiser et al. ........ 395/375 |

OTHER PUBLICATIONS

Sohi et al., "Instruction Issue Logic for High-Performance Interruptable Pipelined Processors", Association of Computing Machinery, pp. 27–34, 1987.
John H. Crawford, "The i486 CPU: Executing Instructions in One Clock Cycle", *IEEE Micro.*, Feb. 1990, pp. 27–36.
Lee et al., "Branch Prediction Strategies and Branch Target Buffer Design", *Computer*, Jan. 1984, pp. 6–22.
David J. Lilja, "Reducing the Branch Penalty in Pipelined Processors", *Computer*, Jul. 1988, pp. 47–55.

*Primary Examiner*—William M. Treat
*Attorney, Agent, or Firm*—Blakely, Sokoloff, Taylor & Zafman

[57] ABSTRACT

An apparatus and method for improving the performance of superscalar pipelined computers using branch prediction and verification that the predicted branch is correct. A predicted branch may be resolved in one of two distinct pipeline stages, and a method is provided for handling branches that are resolved in either of the pipeline stages. A branch verification method is provided that verifies that the architecturally correct instructions are in the decode and execution stages. Furthermore, two sets of prefetch buffers are provided to allow branch prediction when multiple clock decoding is required by a multi-clock instruction.

15 Claims, 9 Drawing Sheets

FIG. 4

|    |   | T1 | T2 | T3 | T4 | T5 | T6 | T7 | T8 |
|----|---|----|----|----|----|----|----|----|----|
| PF | u | I1 | I3 | I5 | I7 |    |    |    |    |
|    | v | I2 | I4 | I6 | I8 |    |    |    |    |
| D1 | u |    | I1 | I3 | I5 | I7 |    |    |    |
|    | v |    | I2 | I4 | I6 | I8 |    |    |    |
| D2 | u |    |    | I1 | I3 | I5 | I7 |    |    |
|    | v |    |    | I2 | I4 | I6 | I8 |    |    |
| EX | u |    |    |    | I1 | I3 | I5 | I7 |    |
|    | v |    |    |    | I2 | I4 | I6 | I8 |    |
| WJ | u |    |    |    |    | I1 | I3 | I5 | I7 |
|    | v |    |    |    |    | I2 | I4 | I6 | I8 |
| WJJ| u |    |    |    |    |    | I1 | I3 | I5 |
|    | v |    |    |    |    |    | I2 | I4 | I6 |

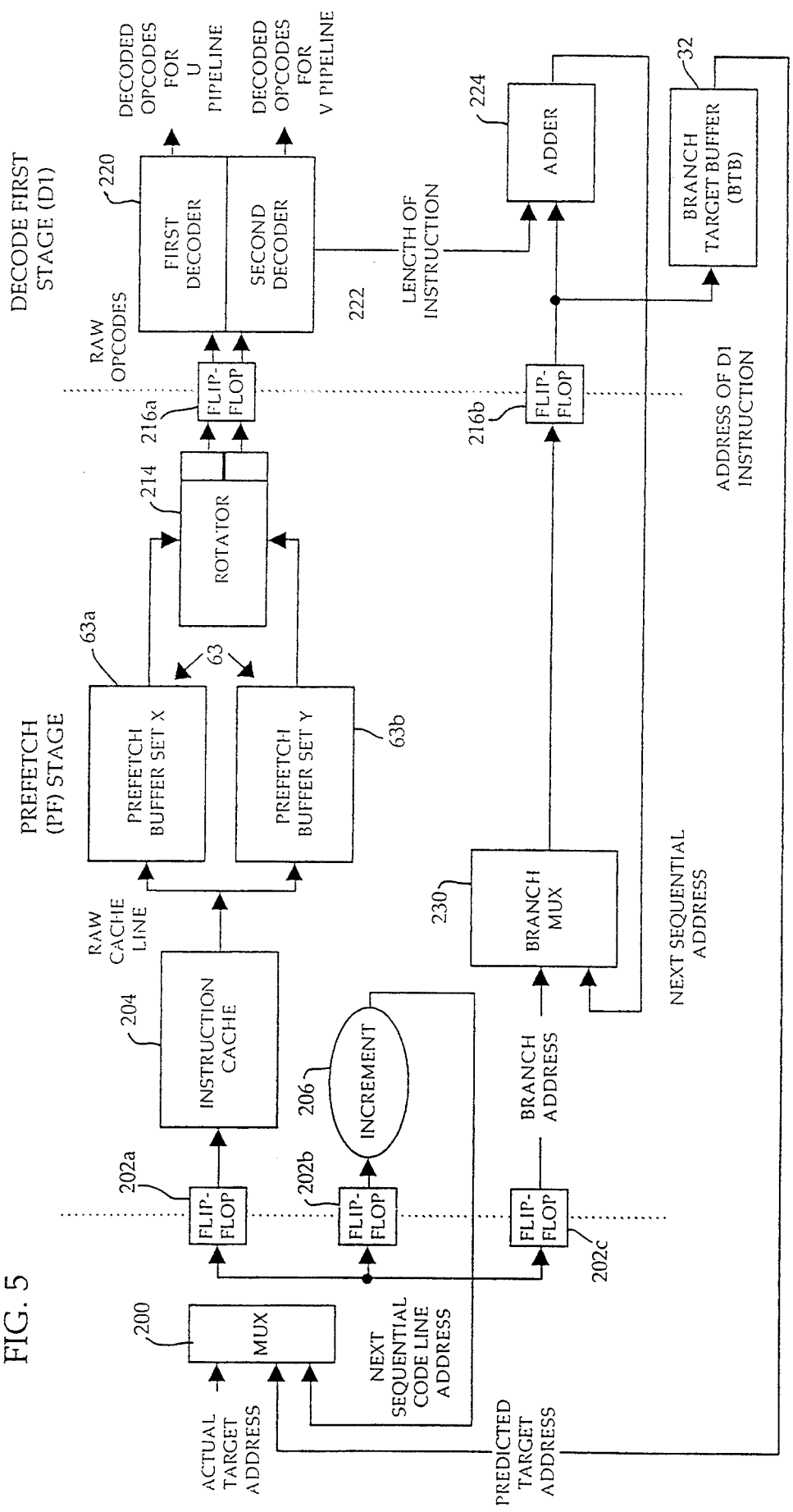

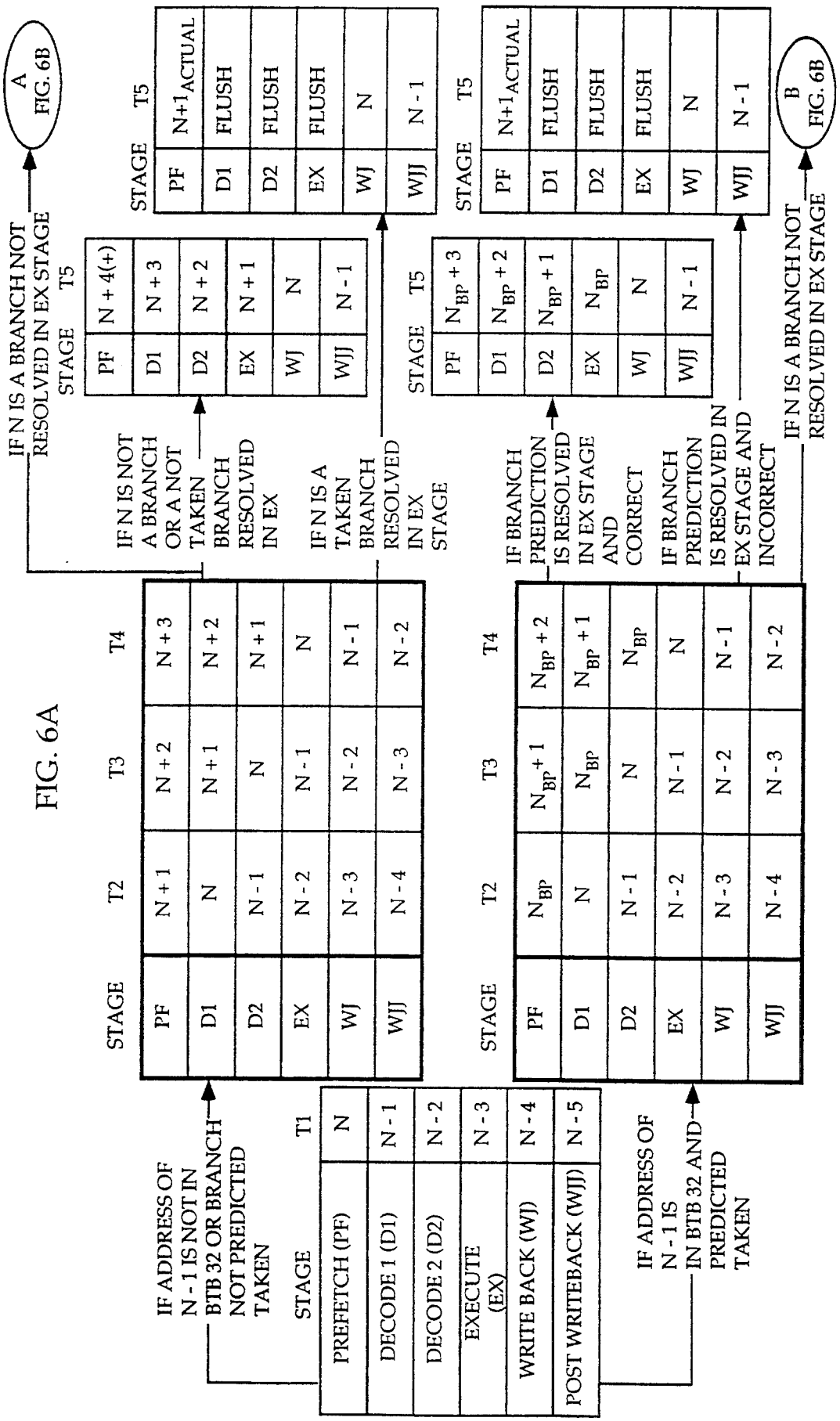

BRANCH PREDICTION AND RESOLUTION APPARATUS FOR A SUPERSCALAR COMPUTER PROCESSOR

CROSS-REFERENCE TO RELATED APPLICATIONS

This application is related to the following copending, commonly assigned U.S. patent applications, which are incorporated by reference herein:

Ser. No. 07/625,761, filed Dec. 10, 1990, entitled "Extended Branch Target Apparatus for a Microprocessor", by Uri C. Weiser et al now U.S. Pat. No. 5,265,213, issued Nov. 23, 1993.

Ser. No. 07/823,881, filed Jan. 23, 1992, entitled "Microprocessor with Apparatus for Parallel Execution of Instructions", by Edward T. Grochowski et al, now U.S. Pat. No. 5,404,468.

Ser. No. 07/831,942, filed Feb. 6, 1992, entitled "End Bit Markers for Instruction Decode", by Edward T. Grochowski et al, now continued as Ser. Nos. 08/010,3560 and 08/301,313.

Ser. No. 07/831,968, filed Feb. 6, 1992, entitled "Two Stage Window Multiplexors for Deriving Variable Length Instructions from a Stream of Instructions", by Edward T. Grochowski et al, now Ser. No. 08/276,089.

Ser. No. 07/831,825, filed Feb. 6, 1992, entitled "Rotators in Machine Instruction Length Calculation", by Edward T. Grochowski et al, now Ser. No. 08/335,305.

BACKGROUND OF THE INVENTION

1. Field of the Invention

The present invention relates to pipelined computer processors having branch target buffers for improving performance of branch instruction execution. The invention is useful for single pipeline architectures and is also useful for superscalar pipelined architectures that have two or more pipelines for processing instructions.

2. Description of Related Art

Computer designers are continually attempting to make computers run faster for higher performance. Computer processors process a series of instructions that are supplied to it from a source such as memory. One way to build faster computers is to design a computer that processes instructions faster.

The original computers were designed to completely process one instruction before beginning the next instruction in the sequence. Major architectural advances that have increased performance include the use of pipelined and superscalar architectures. These architectures introduce higher levels of design complexity and cost in the computer processors, however this additional cost is more than offset by the increased performance of pipelined and superscalar computers.

Performance can also be increased by use of caches in computer architectures. Caches are utilized to store and supply often used information such as data and instructions. Within one clock cycle, a cache can supply the needed information without the memory access that could consume several cycles. One example of a cache that increases performance during a branch instruction is termed a "branch target buffer".

In addition to speed, another concern of processor designers is the processor's compatibility with previously designed processors. If any new computer is to be commercially successful, it must have a base of application programs which it can run when it is introduced in order to be of interest to users. The most economic way to provide such programs is to design the new computer processor to operate with the programs designed for an earlier computer or family of computers. This type of design for compatibility is exemplified by the microprocessors manufactured by INTEL Corporation including the 8086, 8088, 80286, i386 TM, and i486 TM hereinafter referred to as the INTEL microprocessors.

As mentioned briefly above, the speed of computers is increased by pipelining instructions. A pipelined computer divides instruction processing into a series of steps, or stages, each of which is executable in a single clock cycle. In a non-pipelined computer, each instruction is processed until it is complete and only then does processing begin on the next instruction. In a pipelined computer, several sequential instructions are processed simultaneously in different stages of the pipeline. Processing in the different processing stages may proceed simultaneously in one clock period in separate portions of the computer. The computers based on INTEL microprocessors, such as the i486 TM microprocessors, pipeline instructions so that each stage of the operation is handled in one clock period. The stages into which instruction processing for an INTEL microprocessor are divided include a prefetch stage for fetching the instruction from wherever it is stored, a first and a second decode stage for decoding the instruction, an execution stage for executing the instruction, and a writeback stage for writing the results of the execution to the registers and memory for later use. Each of the steps is designed to require one clock period. Thus during a first clock period the prefetch portion of the computer fetches an instruction from storage and aligns it so that it is ready for decoding. During a second clock period, the prefetch portion of the computer fetches the next instruction from storage and aligns it, while the first stage decoder portion of the computer decodes the first instruction fetched. During the third clock period, the first instruction fetched is further decoded in the second stage decoder, the second instruction fetched is decoded in the first stage decoder, and another instruction is fetched and aligned in the prefetch stage. Pipelining continues through each of the stages including the execution stage and the writeback stage, and thus the overall speed of computer processing is significantly increased over a non-pipelined computer.

In a superscalar architecture, two or more instructions may be processed simultaneously in one stage. A superscalar computer has two or more processing paths that are capable of simultaneously executing instructions in parallel. In a scalar computer, the same type of instructions would be run serially. It should be apparent that if two or more instructions are run simultaneously, then the computer can process instructions faster.

If a branch instruction, such as a jump, return, or conditional branch, is in the series of instructions, a pipelined computer will suffer a substantial performance penalty on any taken branch unless there is some form of branch prediction. The penalty is caused on a taken branch because the next instructions following in the pipeline must be thrown away, or "flushed." For example, if the microarchitecture has three stages preceding an execution stage, then the penalty will be at least three clock cycles when a branch is taken and not predicted, assuming the branch is resolved in the execution stage. This penalty is paid when the incorrect instructions are flushed from the pipeline and the correct instruction at the actual target address is inserted into the pipeline.

One way to increase the performance of executing a branch instruction is to predict the outcome of the branch instruction, and insert the predicted instruction into the pipeline immediately following the branch instruction. If such a branch prediction mechanism is implemented in a microprocessor, then the penalty is incurred only if the branch is mispredicted. It has been found that a large number of the branches actually do follow the predictions. That this is so can be exemplified by the prevalence of repetitive loops. For example, it may be found that 80% of the branch predictions are correct.

Several types of branch prediction mechanisms have been developed. One type of branch prediction mechanism uses a branch target buffer that stores a plurality of entries including an index to a branch instruction. In addition to the index, each entry may include an instruction address, an instruction opcode, history information, and possibly other data. In a microprocessor utilizing a branch target buffer, the branch prediction mechanism monitors each instruction as it enters into the pipeline. Specifically, each instruction address is monitored, and when the address matches an entry in the branch target buffer, then it is determined that that instruction is a branch instruction that has been taken before. After the entry has been located, the history information is tested to determine whether or not the branch will be predicted to be taken. Typically, the history is determined by a state machine which monitors each branch in the branch target buffer, and allocates bits depending upon whether or not a branch has been taken in the preceding cycles. If the branch is predicted to be taken, then the predicted instructions are inserted into the pipeline. Typically, the branch target entry will have opcodes associated with it for the target instruction, and these instructions are inserted directly into the pipeline. Also associated with the branch target buffer entry is an address that points to the predicted target instruction of the branch. This address is used to fetch additional instructions.

Processing the branch instruction and each following instruction then proceeds down the pipeline for several clock cycles until the branch instruction has completed the execution stage, after which the "takenness" of the branch is known. If the branch is taken, the actual branch target address of the branch will be known. If the branch has been correctly predicted, then execution will continue in accordance with the prediction. However, if the branch has been mispredicted, then the pipeline is flushed and the correct instruction is inserted into the pipeline. In a superscalar computer, which has two or more pipelines through which instructions flow side-by-side, the performance penalty on a misprediction is even greater because at least twice the number of instructions may need to be flushed.

In a superscalar architecture, the designer must make decisions regarding in which pipeline branch instructions are to be permitted. In other words, the designer must decide whether or not to allow branch instructions in one pipeline, another pipeline, or two or more. If, for example, a branch instruction is permitted to be in only the first pipeline, then the capabilities of the superscalar architecture are not being fully utilized.

It would be an advantage to provide an apparatus, including a branch target buffer, which provides increased performance in a superscalar microprocessor and if a branch instruction could be executed in either of the pipelines. It would be an advantage if the silicon space requirements could be reduced, costs could be reduced, and cache coherency problems were avoided. It would also be an advantage if the branch prediction mechanism were compatible with multi-clock instructions, which require at least two clocks to decode, and also require additional code that is in the prefetch stage. An example of such a multi-clock instruction is a prefixed instruction in the INTEL microprocessors.

SUMMARY OF THE INVENTION

The present invention provides an apparatus and method for improving the performance of superscalar pipelined computers using branch prediction. The described embodiment has two instruction processing paths, or "pipelines" and a branch instruction can be executed in either pipeline, subject to restrictions described further herein. In the first pipeline, the takenness and target of a branch instruction is known in the execution stage. In the second pipeline, the target of a branch instruction is known in the execution stage, but the takenness may not be known until after the execution stage. In order to allow a branch instruction in one of the pipelines to be paired with an instruction in the other pipeline, a way of handling branches that are resolved in one of the separate stages is provided. Furthermore, two sets of prefetch buffers are provided to allow branch prediction when multiple clock decoding is required by a multi-clock instruction.

"Branch prediction" is a means of speculatively filling a pipeline with instructions at the target of a branch before it is known whether the branch will be taken and before the target address is known. The present invention may be embodied in an apparatus for predicting a branch location in a sequence of instructions in a superscalar microprocessor that has a first and second pipeline, either of which can execute a branch instruction. A branch target buffer is provided to store branch predictions that are supplied to an address selector for the prefetch unit, in response to an address in the pipeline indicative of a branch instruction. The branch target buffer includes a plurality of entries having a tag field for storing a tag indicative of the address of a branch instruction, an address field for storing a target address predicted for the branch instruction, and a history field for storing a history of the branch takenness. The history field may be dual ported for both reading and writing in a single clock cycle. Also, the tag field may store the address of an instruction preceding a branch instruction, rather than the address of the branch instruction itself.

The superscalar architecture of the preferred embodiment includes separate instruction paths through which instructions can flow in parallel. In the preferred embodiment, the microprocessor has two pipelines; i.e., each stage can obtain and process two instructions in parallel. A first pipeline includes means for decoding and executing a first set of instructions in the microprocessor, the first set including a branch instruction. The second pipeline includes means for decoding and executing a subset of the first set of instructions in the microprocessor, the subset including a branch instruction. Each of the pipeline stages may include a prefetch stage for fetching and buffering instruction code lines, a decode stage for receiving instruction code from the prefetch stage and decoding the instructions, and an execution stage including means for calculating an actual target address from a branch instruction. One or more stages may follow the execution stage. The preferred embodiment also has a writeback (WJ) stage, in which instructions that have been executed are enabled to modify the processor state and otherwise complete execution. A final, sixth stage is a post-writeback (WJJ) stage which is useful for storing the address of the previous instruction in the writeback stage. The post-writeback stage is useful, as will be described, to update and allocate entries in the branch target buffer.

To select an address to be fetched by the prefetch stage, a multiplexer selects between a next sequential code line, the predicted target address, and an actual target address. In order to verify that a predicted branch has actually been taken, a branch verification apparatus compares the actual target address computed in the execution stage with the address of the instruction in the stage following the branch instruction.

"Branch verification" is used to check that the architecturally correct instructions are in the execution stage. In the preferred embodiment, branch verification may occur in either of two stages, depending upon whether or not the branch instruction can be resolved in that stage. In this context, a branch instruction is "resolved" in the pipeline stage in which it is known whether or not a conditional branch has been taken, i.e., the stage in which the takenness of a branch is known. In other words, "to resolve" means to determine whether a conditional branch will be taken (thereby altering the control flow), or if the branch will not be taken, allowing control flow pass to the next sequential instruction.

A branch instruction can be resolved in either the execution stage, or later, in a post-execution stage such as the writeback stage. During operation, it is likely that most branch instructions will be resolved in the execution stage. However, some types of branches, such as conditional branches in the second pipeline which are dependent upon the result of an instruction in the first pipeline, are not resolved until the post-execution stage. In order to optimize performance and allow a branch to be paired with another instruction upon which it depends, the branch verification apparatus verifies the correct branch prediction in both the execution stage and the post-execution stage. A method described herein includes branch verification in both the execution stage and a stage following the execution stage (a "post-execution" stage).

If the branch verification apparatus indicates that the incorrect instruction is following a branch instruction, then the pipeline is flushed in accordance with conventional techniques, and the correct target instruction is applied into the pipeline. A penalty in performance is paid when there has been a misprediction. However, the preferred embodiment optimizes the number of mispredictions, and the penalty for the misprediction.

The preferred embodiment has features that are useful for purposes including decoding and executing variable length instructions. Specifically, the tag in the branch target buffer refers to an instruction preceding a branch instruction. Although in many instances it would have been preferable to tag the branch instruction address directly, the address of the previous instruction provides substantially similar information. Due to the variable length of the instructions, the instruction pointer of the current instruction in the prefetch unit is not known until the preceding instruction is in the decode stage, because the prefetch stage does not have a byte granular decoder. By using the instruction preceding the branch instruction as a tag, a cycle loss is avoided if there is a branch prediction. In other words, using the previous instruction as a tag allows the target instruction to be placed into the pipeline immediately following the branch instruction. Furthermore, the entry in the buffer contains the address of the predicted instruction, but not the instruction code. The absence of the instruction code saves silicon space, reduces cost, and eliminates the need to keep the instructions in the branch target buffer consistent with memory.

In the preferred embodiment, there are two pipelines: a "u-pipeline" and a "v-pipeline". The tag, which will be stored in the branch target buffer is obtained from the u-pipeline only. If there is a branch instruction in the u-pipeline, then an instruction pairing rule prevents a branch from appearing in the v- pipeline. However, the instruction pairing rules permit a branch instruction in the v-pipeline if other instructions are in the u-pipeline, even if the outcome of the branch is dependent upon the outcome of the instruction in the u-pipeline.

In the preferred embodiment, two sets of buffers are provided in the prefetch unit. These buffers include a first prefetch buffer set and a second prefetch buffer set. Either set is selectable to supply instruction code. The two buffer set configuration is useful for continuing uninterrupted instruction flow. It is also useful when an instruction preceding a branch, or a branch instruction, requires additional code for its execution. Particularly, this configuration is useful for "prefixes" which are permitted in the instruction set of the preferred embodiment.

BRIEF DESCRIPTION OF THE DRAWINGS

FIG. 3A illustrates a D2 to Ex verification method, and FIG. 3B illustrates an Ex to WJ verification method.

FIG. 4 is a diagram illustrating instruction flow in a superscalar architecture of the preferred embodiment.

FIG. 5 is a detailed block diagram of the prefetch stage in the first stage decoder in the preferred embodiment.

FIGS. 6A and 6B are diagrammatic illustrations of instruction flow in the preferred embodiment under different conditions that may result during operation of the branch prediction and verification apparatus of the preferred embodiment.

DETAILED DESCRIPTION OF THE PREFERRED EMBODIMENT

The invention is best understood by reference to the figures wherein like parts are designated with like numerals throughout. The following description first describes the preferred embodiment in general terms, with reference to the figures. Subsequent to the general description, a specific description describes more particular aspects, again with reference to the figures.

General Description

Figure 1:
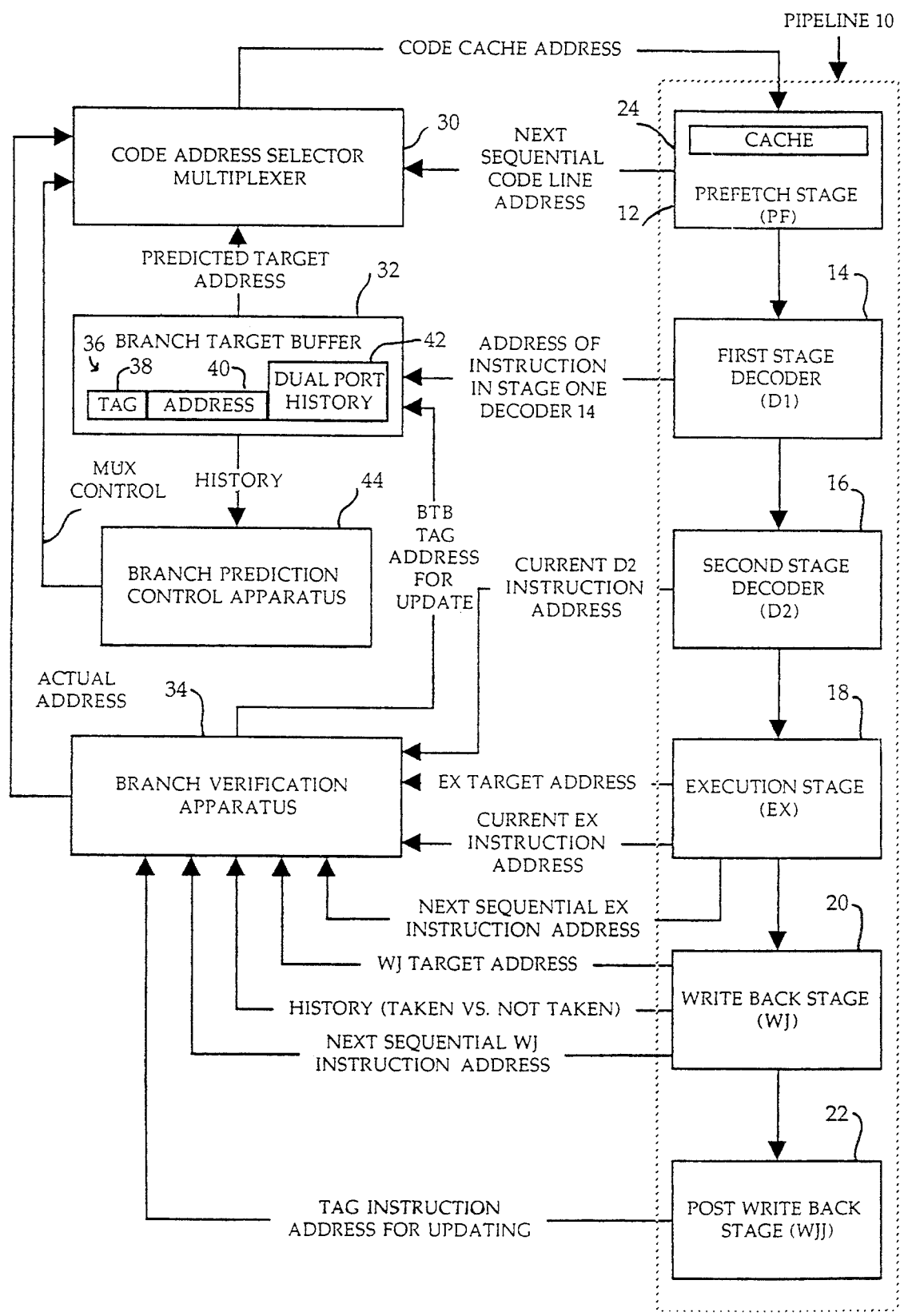
FIG. 1 is a block diagram of the pipeline, the branch target buffer, and related apparatus in the preferred embodiment.

FIG. 1 is a block diagram illustrating the apparatus for predicting and verifying branch target addresses. On the right hand side of FIG. 1, a pipeline 10 is illustrated in dotted lines. The stages of the pipeline include a prefetch stage 12, a first stage decoder 14, a second stage decoder 16, an execution stage 18, a writeback stage 20 and a post-writeback stage 22. Each stage executes in a single clock cycle. The above stages are the stages implemented in the preferred embodiment which is described in greater detail below. In other embodiments, the number, or the name of the stages may vary. Furthermore, in the preferred embodiment, the architecture is a superscalar architecture. Thus, each stage may be able to process two or more instructions simultaneously. In the preferred embodiment, two parallel paths are provided for each stage, so that there is a dual decoder, a dual execution stage, a dual writeback stage, and a dual post-writeback stage. In other embodiments, more than two parallel paths may be provided for each stage. For ease of description, the following description of FIG. 1 assumes a single pipeline. It should be apparent to one skilled in the art that the description could also be applied to superscalar architectures.

The prefetch stage 12 buffers information including instruction code from a cache 24 that fetches instructions from memory and stores them for quick access. The instruction from the prefetch stage 12 is applied to the first stage decoder 14, which substantially decodes the instruction supplied to it. The second stage decoder 16 is used in the preferred embodiment for address generation. The execution stage 18 includes apparatus for executing the instruction. The writeback stage 20 includes apparatus for finalizing the executed instructions, including posting the results of the execution stage to the registers, and other tasks. The post-writeback stage 22 is used to store an instruction address, and is useful for updating the branch target buffer as will be described.

A code address selector multiplexer 30 is provided to supply an address to the pipeline 10. Specifically the address from the multiplexer 30 supplies the address of instruction code to be fetched in the next clock cycle. In the preferred embodiment, if the address has an entry in the code cache 24, then that instruction is supplied directly to the prefetch stage 12. If the instruction address is not already stored in the code cache 24, then a memory cycle is run to fetch the code into the code cache 24. The corresponding instruction is then supplied to the prefetch stage 12. Use of the cache 24 is not essential to the invention, and other designs may use a different method of supplying instruction code into the prefetch stage 12. The code address selector multiplexer 30 selects from inputs including a predicted target address from branch target buffer 32, a next sequential code line address from the prefetch stage 12, and an actual target address from the branch verification apparatus 34.

The branch target buffer 32 contains a plurality of entries, an exemplary one of which is shown as entry 36. The entry 36 includes a tag 38, an address 40, and history information 42. In the preferred embodiment the branch target buffer 32 includes 256 entries, it is 4-way set associative, it uses a random replacement policy, and it allocates entries for taken branches only. The apparatus also includes a branch prediction control apparatus 44 which is supplied with history information from the branch target buffer 32. Based upon the history information in the branch target buffer 32 for a selected entry, it controls the multiplexer 30 to select an address as will be explained further below.

The branch target buffer 32 also is connected to the first stage decoder 14, which supplies an address of the instruction in the first stage decoder 14. The address in the decoder 14 is compared against the tag 38. Specifically, the address of the instruction in the first stage decoder 14 is compared with the tags in the branch target buffer 32.

The branch verification apparatus 34 has a number of inputs which are useful for determining if the instruction following a branch instruction is the correct instruction as will be explained further below. The inputs to the branch verification apparatus 34 include a current D2 instruction address from the second stage decoder 16. The inputs also include, from the execution stage 18, an execution (Ex) target address, a current Ex instruction address, and the next sequential Ex instruction address. For purposes of definition, the letters "Ex" will be used to denote the address associated with the execution stage at a particular instant in time.

The branch verification apparatus 34 has inputs from the writeback stage 20, including a WJ target address, a next sequential WJ instruction address, and history information as to whether a branch has been taken or not. The branch verification apparatus 34 also has an input from the post-writeback stage which includes the tag for updating the instruction address.

Figure 2:
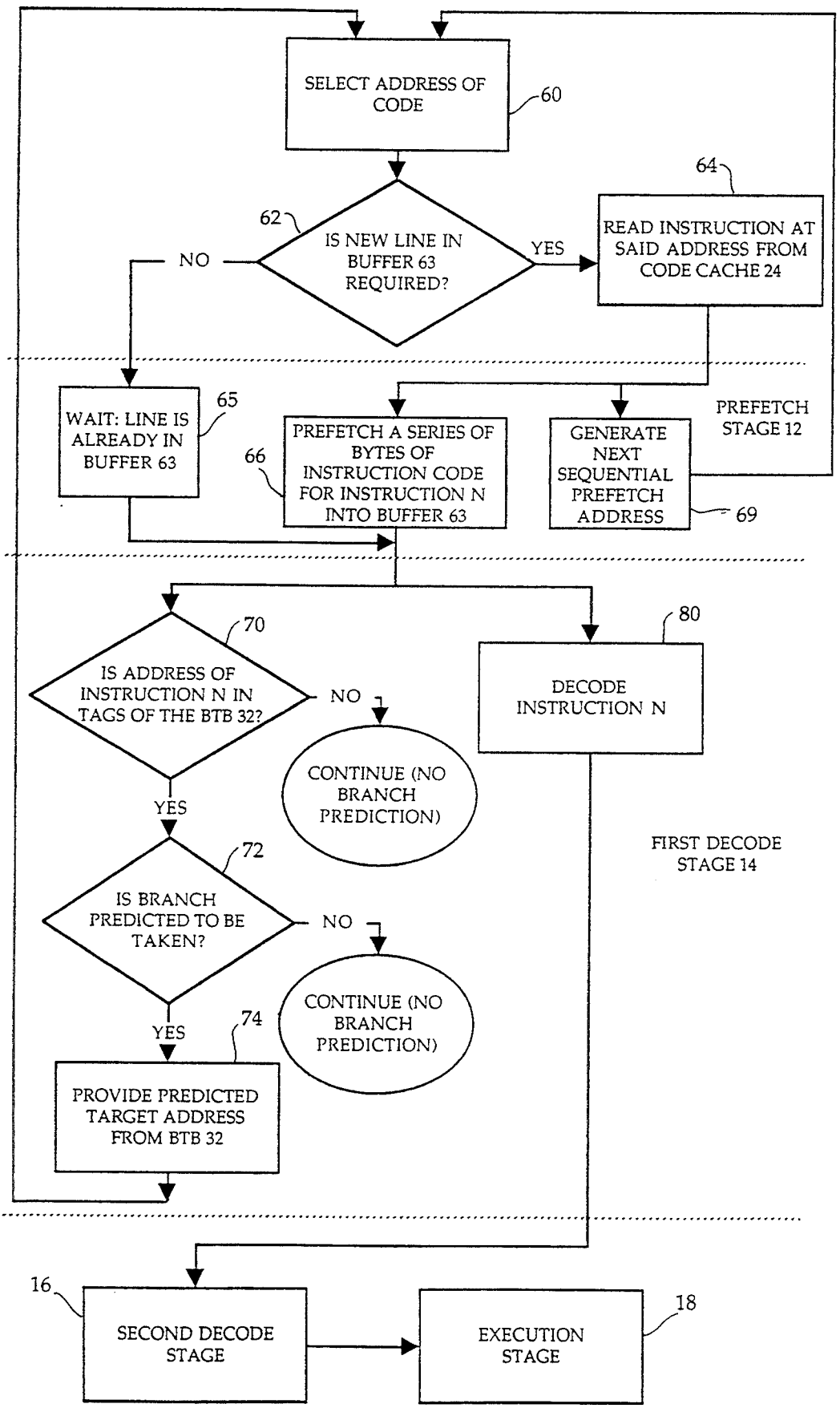
FIG. 2 is a flow chart illustrating operation of the branch prediction control apparatus of the preferred embodiment.
Figure 3A:
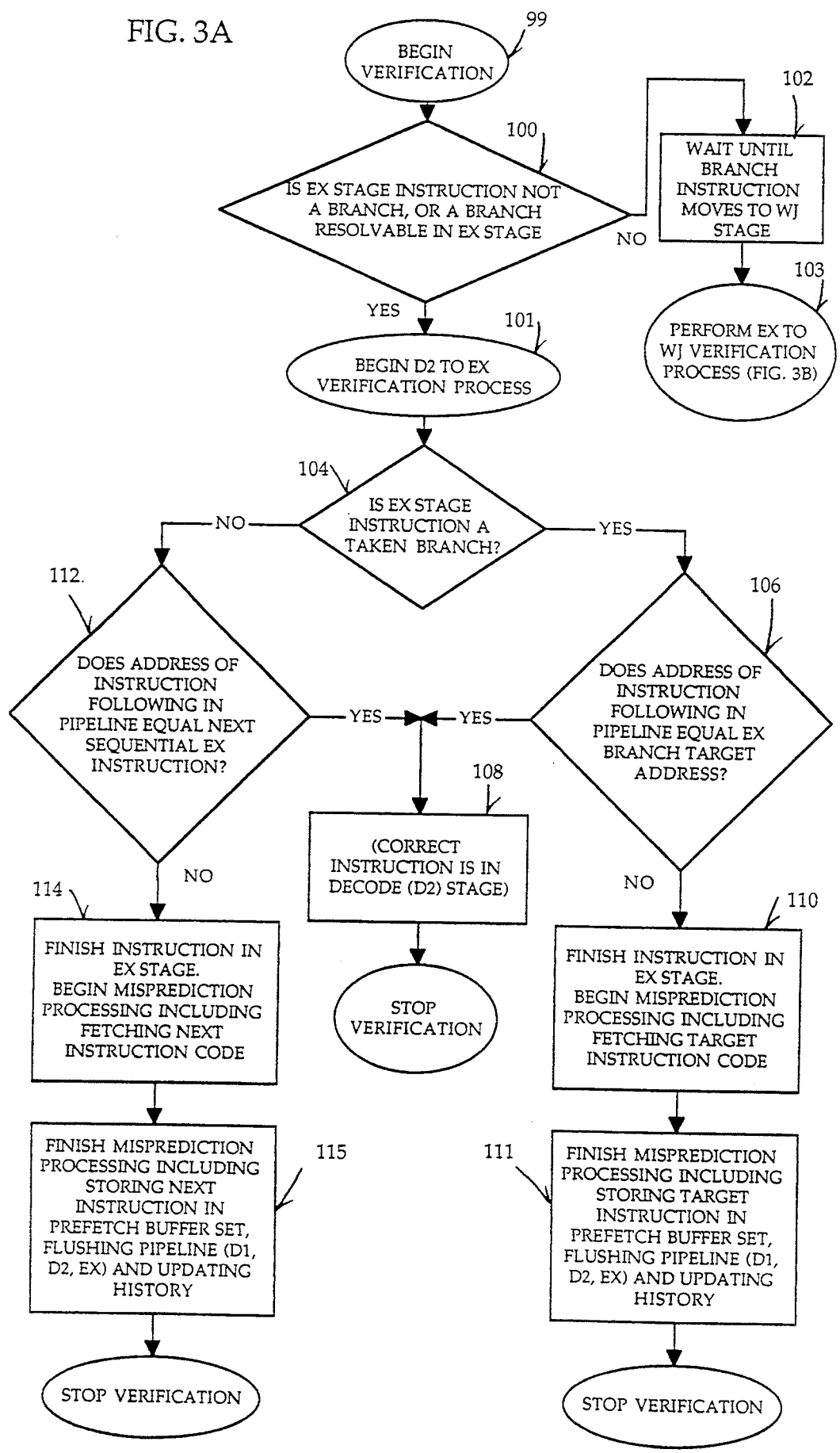
FIGS. 3A and 3B are flow charts illustrating operation of the branch verification method of the preferred embodiment.
Figure 3B:
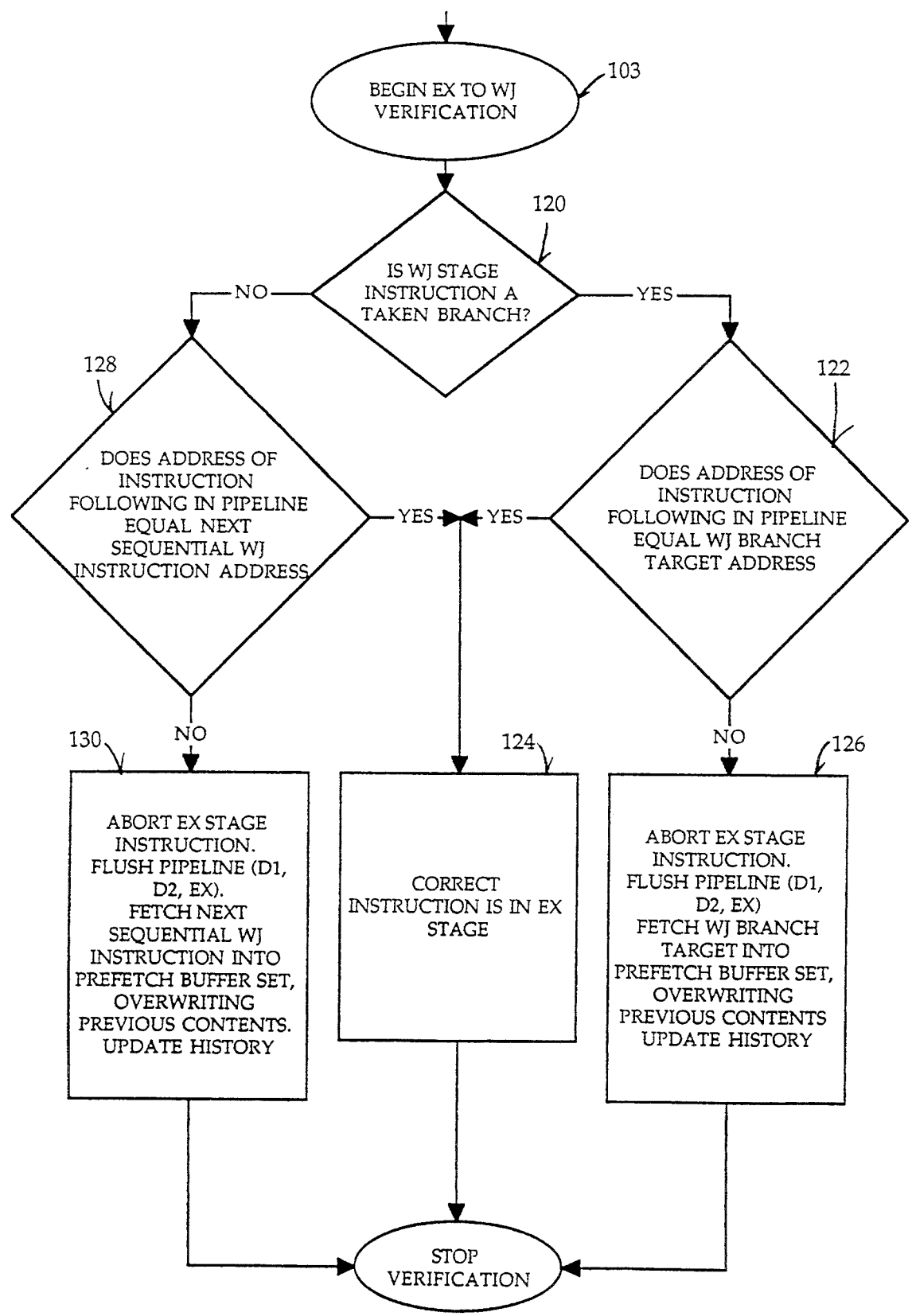

FIG. 2 is a flow chart that illustrates the branch prediction method of the present invention. FIGS. 3A and 3B are flow charts that illustrate the branch verification method. Beginning in FIG. 2, the address of the code is selected in a box 60. This address is then applied to a decision box 62. If a new line is required in buffers 63 that preferably includes a buffer pair including a first buffer 63a and a second buffer 63b (see FIG. 5) in the prefetch stage 12, then the instruction at the new line is read into the code cache 24 as illustrated in a box 64. Then, operation moves to a box 69 in which the next sequential prefetch address is generated and applied to the box 60 which selects the code address. Returning to the decision 62, if no new line is needed, then it simply waits as illustrated in a box 65 because it is not necessary to read information into the prefetch stage 12. This method is useful due to the architecture of the preferred embodiment, in which the instructions are a variable length, and the buffers 63 within the prefetch stage 12 can store more than one instruction. These buffers 63 will be described in more detail with reference to FIG. 5.

If a new code line is required; then in the prefetch stage 12, as illustrated in a box 66, a series of bytes of instruction code are fetched into the buffers 63 to be available for supplying to the decode stage 14. It should be remembered that the preferred embodiment is a superscalar machine with dual pipelines, and the instruction code is supplied from the prefetch stage 12 into the decode stage 14 in parallel. In other words, two instructions are supplied into the decode stage 14, specifically into a dual decoder as described in the patent applications incorporated by reference herein.

In FIG. 2, the branch prediction method is performed after an instruction code is supplied into the decode stage 14 and proceeds in parallel with decoding. First as illustrated in a box 70, the address of the instruction is compared with the addresses of the tags in the branch target buffer 32. If there is no match then operation is continued without branch prediction. However if a match is found in the branch target buffer 32, then operation proceeds to a decision box 72 in which the history bits 42 are tested to determine whether or not the branch is predicted to be taken. The method for determining whether or not the branch is to be taken is described with reference to FIG. 7. If the branch is not predicted to be taken, then operation continues without branch prediction. However, if the branch is predicted to be taken, then as illustrated in the box 74 the predicted target address from the branch target buffer 32 is provided from the box 74 to the box 60 which selects the predicted target address of the code. Which of the addresses is actually selected by the box 60 depends upon whether or not the branch is predicted to be taken. This branch prediction is complete in one cycle, and proceeds in parallel with the first stage decoder 14 (FIG. 1).

Thus, in parallel with the branch prediction of the boxes 70, 72, and 74, the instruction N is decoded in the first stage, as illustrated in a box 80. Following the first decode stage 14 is the second stage decoder 16 and the execution stage 18, in which the instruction N is executed.

FIGS. 3A and 3B illustrate the verification process that begins following execution of the instruction in the box 18 (FIG. 2). The branch is not resolvable (i.e., the "takenness" is not known) until either the execution stage or the WJ stage, depending upon the pipeline in which the branch is executed. Specifically, FIG. 3A shows the method useful when the branch is resolvable in the Ex stage, which may be termed a "D2 to Ex verification method" using the terms that refer to the stages that are checked during verification. FIG. 3B shows a method useful when the branch is not resolvable until the WJ stage, which may be termed a "Ex to WJ verification method". Both methods proceed substantially in parallel in the pipeline.

Beginning with the box 99, the verification process begins for an instruction in the execution stage 18. Beginning in the decision box 100, if the instruction in the execution stage 18 is a non-branch instruction, or a branch instruction that is resolvable in the execution stage, then operation moves to a box 101 in which the D2 to Ex verification process is performed. However, if the instruction in the execution stage is a branch only resolvable in the WJ stage 20, then operation moves to a box 102 in which operation waits until the instruction moves to the WJ stage. Then, operation moves to a box 103, that redirects operation to the Ex to WJ verification method described in FIG. 3B.

Returning to the D2 to Ex verification process in FIG. 3A, if the instruction in the execution stage is not a branch instruction or a branch instruction resolvable in the execution stage, then operation moves to the decision 104. If the instruction in the execution stage is a taken branch, then operation moves to the decision box 106 in which the address of the instruction following in the pipeline 10 is tested to see if it is equal to the Ex branch target address. If there is a match, then the correct instruction is in the second decode (D2) stage (the previous stage) as illustrated in a box 108 and the verification process can be stopped and normal processing may continue. However if the decision 106 determines that the address following is not equivalent, then processing the instruction in the execution stage continues until finished, and misprediction processing is performed, including fetching the execution branch target, as illustrated in the box 110. In the next box 111, the target instruction is stored in the prefetch buffer set, the pipeline is flushed and history information is updated. Following that, the verification process is complete and normal processing may continue. Returning to the initial decision 104, if the Ex stage instruction is not a taken branch, then operation moves to the decision 112 in which the address of the instruction following the pipeline is tested to see if it is equal to the next sequential Ex instruction. If there is a match, then operation moves to the box 108 in which the correct instruction is in the previous stage, and the verification process is complete. However, if the address of the instruction following in the pipeline is not equal to the next sequential Ex instruction as shown in the box 112, then operation moves to the box 114 in which processing the instruction in the Ex stage is finished, and misprediction processing is performed including fetching the next instruction code. Operation moves to the box 115 in which the next instruction is stored in the prefetch buffer set, the pipeline is flushed, and the history information is updated.

If the branch is not resolved in the execution stage, then the branch instruction passes into the WJ stage in which the results of the calculations are applied to update the processor state. As illustrated in the decision 120 in FIG. 3B, if in the WJ stage the instruction is a taken branch, then a next decision 122 is made to determine whether or not the address of the instruction following in the pipeline 10 is the WJ branch target address. If there is a match, then the correct instruction is in the execution stage as illustrated in a box 124, and the verification process is complete. However if the address is not the same, then as illustrated in the box 126 the execution stage instruction is aborted, the pipeline 10 is flushed, the WJ branch target address is fetched into the prefetch buffer set, the history is updated, and the verification process is complete. More than one cycle may be necessary to complete fetching the instruction into the buffer set, particularly if a memory cycle is necessary to bring the instruction into the code cache 24 which is then supplied to the buffers. Following completion of the verification process, the pipeline 10 continues to process instructions beginning at the instruction in the target address.

However, returning to the decision 120, if the WJ stage instruction is not a taken branch, then in the decision 128, the address of the instruction following in the pipeline 10 is tested to see if it is equal to the next sequential WJ instruction address. If it is equal, then the correct instruction is in the execution stage as illustrated in the box 124. However if the addresses are not the same, then as illustrated in a box 130 the execution stage instruction is aborted, the pipeline 10 is flushed, the next sequential WJ instruction is fetched into the prefetch buffer, and the history is updated. More than one cycle may be necessary to complete fetching the instruction into the buffer set, particularly if a memory cycle is necessary to bring the instruction into the code cache 24 which is then supplied to the buffers. Following that, the verification process is complete and no further verification processing is needed.

In the event that both verification processes (i.e., both the D2 to Ex and the Ex to WJ processes disclosed in FIGS. 3A and 3B) encounter an incorrect instruction sequence, then precedence goes to the Ex to WJ verification process. In that event, the method disclosed in FIG. 3B would be utilized.

Specific Description

The following description is a specific description of the preferred embodiment, which is implemented in an INTEL microprocessor. However, it will be apparent to one skilled in the art that the principles of the present invention may be implemented in other microprocessor configurations and arrangements, and the invention is not limited to the architecture described herein.

In the preferred embodiment, integer instructions traverse a five-stage integer pipeline. There are five sequential pipeline stages, and a sixth stage which has limited purposes to be described. The five stages of the pipeline include a prefetch (PF) stage, an instruction decode stage (D1), an address generate (D2) stage, an execute-ALU and cache access (Ex) stage, and a writeback (WJ) stage. The sixth stage is a post-writeback (WJJ) stage. These stages are illustrated in FIG. 4, and also in FIG. 6. In other embodiments, a different number of stages may be employed. For example, in a floating point pipeline, there may be several stages following the execution stage.

The preferred embodiment is a superscalar computer capable of executing two instructions in parallel. The two five-stage pipelines operate in parallel to allow integer instructions to execute in a single dock in each pipeline. The pipelines in the preferred embodiment will be termed the "u" and "v" pipes, and the process of issuing two instructions in parallel is termed "pairing". FIG. 4 is a diagram illustrating flow of instructions, denoted by an uppercase "T"and a number. The dotted line separates the u-pipe instruction from the v-pipe instruction. The u-pipe can execute any instruction in the INTEL architecture while the v-pipe can execute "simple"instructions as defined further in the instruction pairing rules to be described below. When instructions are paired, the instruction issued to the v-pipe is the next sequential instruction after the instruction issued to the u-pipe.

The stages of the pipelines will now be described in more detail. The first stage of the pipeline is the prefetch (PF) stage in which instructions are prefetched from an on-chip instruction cache. In the preferred embodiment there are separate caches for instructions and data, and therefore prefetches do not conflict with data references for access to the cache. In the PF stage, there are two independent pairs of line size prefetch buffers, to be described with reference to FIG. 5, that operate in conjunction with the branch target buffer 32 to allow prefetches for one execution path to occur in parallel with execution down another path. The next pipeline stage is the instruction decode (D1) stage in which two parallel decoders decode and issue the next two sequential instructions. The decoder is used to determine whether one or two instructions can be issued, contingent upon the instruction pairing rules to be described. In the preferred embodiment, which is designed to be compatible with prior INTEL microprocessors, an extra clock is required to decode instruction prefixes. Prefixes are issued to the u-pipe at the rate of one per clock without any pairing. After all prefixes have been issued, the base instruction is then issued and paired according to the pairing rules to be stated below. An exception to this is that the preferred embodiment will decode near conditional jumps (long displacement) in the second opcode map in a single clock in either pipeline. The D1 stage is followed by the address generate (D2) stage in which the address of memory resident operands are calculated similar to prior INTEL microprocessors. The execute (Ex) stage of the pipeline is used for both ALU operations and for data cache access. Thus, instructions specifying both an ALU operation and a data cache access will require more than one clock. In the Ex stage, all u-pipe instructions and all v-pipe instructions except conditional branches are verified for correct branch prediction. The fifth stage is the writeback (WJ) stage where instructions are enabled to modify the processor state and complete execution. In this stage v-pipe conditional branches are verified for correct prediction.

As discussed above, the preferred embodiment can issue one or two instructions every clock cycle. Instructions may be paired under the following conditions:
(1) Both instructions in the pair must be "simple" as defined below,
(2) There must be no read-after-write or write-after-write register dependencies between them,
(3) Neither instruction may contain both the displacement and an immediate,
(4) Instructions with prefixes (other than OF (in hexadecimal) of JCC instructions) can only occur in the u-pipe.

Simple instructions are defined as those that are entirely hardwired. Simple instructions do not require microcode control and, in general, execute in one clock. Sequencing hardware is used to handle instructions with memory resident operands in two or three clocks. A further description of the pairing rules and dependencies is in the patent application filed by Edward T. Grochowski et al. entitled "Microprocessor with Apparatus for Parallel Execution of Instructions", Ser. No. 07/823,881, filed Jan. 23, 1992, which is incorporated by reference herein.

FIG. 5 is a block diagram illustrating the apparatus for performing the operations in the PF stage and the D1 stage. Beginning at the left hand side of FIG. 5, a multiplexer 200 selects between an actual target address, a predicted target address, and a next sequential code line address. The actual target address is supplied by the branch verification apparatus 34 (FIG. 1), the predicted target address is supplied from the branch target buffer 32, and the next sequential code line address is supplied as will be described subsequently. The multiplexer 200 supplies its inputs through the flip-flops 202a, 202b and 202c, which are clocked by the prefetch stage clock as illustrated by a dotted line. The flip-flop 202a applies the output of the multiplexer 200 to the instruction cache 204, in which a plurality of code lines are used to store code information. In the preferred embodiment, code is supplied as instructions only from the instruction cache 204. This can be accomplished within one clock cycle. Thus, if an instruction at a given address is needed and it is not already in the cache, it must first be fetched from memory and stored in the instruction cache 204. The flip-flop 202b applies the output of the MUX 200 to an adder 206 which generates the next sequential code line address.

Returning to the instruction cache 204, a raw cache line is supplied to two sets of buffers, a first prefetch buffer set 63a and a second prefetch buffer set 63b. Each set of buffers 63a, 63b includes a pair of 32-byte buffers controlled together to provide a total of 64 bytes in each set. Either set may be selected to supply instruction code to a rotator 214. The rotator 214 is described more fully in the patent application by Edward T. Grochowski, entitled "Rotators in Machine Instruction Length Calculation", Ser. No. 07/831,825, filed Feb. 6, 1992, and another patent application entitled "Two Stage Window Multiplexers for Deriving Variable Length Instructions from a Stream of Instructions", by Edward T. Grochowski et al., Ser. No. 07/831,968, filed Feb. 6, 1992, which are incorporated by reference herein.

The two instructions are applied through the flip-flop 216a to supply raw opcodes of the first instruction to a first decoder 220 and the raw opcodes of the second instruction a second decoder 222. The first decoder 220 supplies decoded opcodes for the u-pipe and the second decoder 222 supplies decoded opcodes for the v-pipe.

The decoders 220, and 222 together provide information indicative of the length of the instruction in the decoders 220, 222 to an adder 224. The use of the adder 224 is described by beginning at the flip-flop 202c, which outputs the address supplied by the multiplexer 200. The branch address is applied to a branch multiplexer 230, which selects between the branch address and a next sequential address to be described. The output of the branch multiplexer 230 is supplied to a flip-flop 216b, which is clocked with each clock cycle. The output of the flip-flop 216b is applied to the adder 224, and also to the branch target buffer 32. Through the flip-flop 216b, the output of the branch multiplexer 230 is applied within the branch target buffer 32 to ascertain if there is a corresponding entry within the branch target buffer 32. The output of the multiplexer 230 is also applied to the adder 224 through the flip-flop 216b which supplies the next sequential address to the multiplexer 230. In operation, the branch address is selected by the multiplexer 230 following a branch or a request for a new code line by the multiplexer 200.

An explanation of the variable length instructions is useful for understanding and implementing the apparatus described and shown with reference to FIG. 5. In order to be compatible with previous INTEL microprocessors, the instructions provided to the preferred embodiment have a variable length between 1 and 15 bytes. The instructions are furnished in a stream of bytes in which no instruction is differentiated from any other. As a result, the end of the first instruction, the length of which is initially unknown, must be determined in one clock period so that the next instruction may be selected during the next clock period. In order to determine the length of an instruction being processed at any time, previous INTEL microprocessors first decoded the instruction to determine its content. Only after this had been accomplished could the length of the instruction being processed and the starting point for the next instruction in sequence be known and fed back to the prefetch unit. The preferred embodiment incorporates the use of end bit markers for instruction decoding, which are described in the patent application by Edward T. Grochowski et al. entitled "End Bit Markers for Instruction Decode", .Ser. No. 07/831,942, filed Feb. 6, 1992, the specification of which is incorporated by reference herein.

Figure 6B:
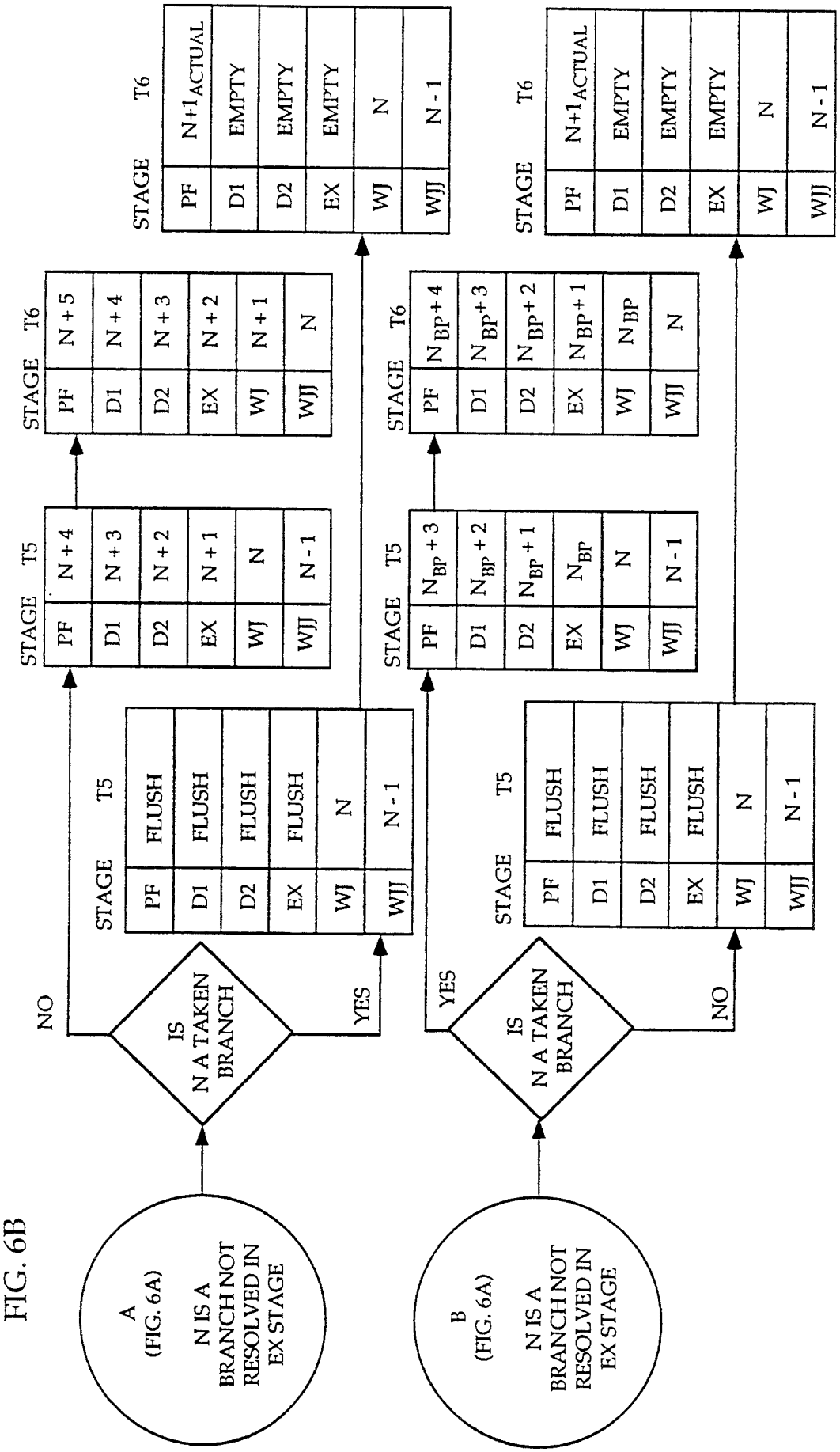

FIGS. 6A and 6B illustrate instruction flow in the preferred embodiment. Beginning on the left, at time T1, the instruction in each of the stages is illustrated. For purposes of this example, the numeral "N" represents a branch instruction. At time T1, the branch instruction N is in the prefetch stage. Also at time T1 the instruction N−1 is in the D1 stage, the instruction N−2 is in the D2 stage, the instruction N−3 is in the Ex stage, the instruction N−4 is in the WJ stage, and the instruction N−5 is in the WJJ stage. Each of these stages has been described previously. Because the preferred embodiment is a superscalar machine, it should also be clear that although this description refers to an "instruction" in each stage, such as instruction N−1, that that instruction actually is an instruction pair in the preferred embodiment, and may be more than two instructions in other embodiments of a superscalar computer.

During the T1 clock cycle, the instruction N−1 in the D1 stage is tested to determine if the branch target buffer 32 has a corresponding entry. Specifically, the address of the instruction N−1 is used as a tag into the branch target buffer 32. The preferred embodiment has two pipelines: a u-pipeline and a v-pipeline. In the preferred embodiment, only the u-pipeline is tested to determine if it holds the address. In the next clock cycle T2, if the address of the instruction N−1 is not in the branch target buffer 32, or if the branch is predicted to be not taken in accordance with the history bits 42 and the branch prediction control apparatus 44 (FIG. 1), then the upper path of FIG. 6A illustrates that operation proceeds with the next sequential instruction N+1. This is illustrated in the clock cycle T2 of the upper path of FIG. 6A, as instruction N+1 going into the prefetch stage. Pipelined operation continues through the clock cycles T3 and T4, in which N is in the Ex stage. Following the cycle T4, if N is a branch not resolved in the Ex stage, then operation moves to FIG. 6B, where the reference numeral "A" designates continued operation, described below in greater detail. If N is not a branch or is a not taken branch resolved in the Ex stage, then the next sequential instruction N+4 is supplied into the PF stage in the next clock cycle T5. However, if instruction N is a taken branch resolved in the Ex stage, the branch verification apparatus 34 (FIG. 1) detects the branch misprediction in clock T4. In the next clock T5, a prefetch is initiated to fetch the correct branch target instruction, $N+1_{ACTUAL}$, into the PF stage and the D1, D2, and Ex stages are flushed.

FIG. 6B illustrates continued operation in the clock cycles T5 and T6. In general there will be a change of instruction flow during times T5 and T6 only if the branch was not resolved in the execution stage, but instead is resolved later in the WI stage. In FIG. 6B, a reference letter A, from FIG. 6A, illustrates a flow of operation from the upper path of FIG. 6A that will be followed if N is a branch instruction resolvable only in the WJ stage. Pipelined operation continues in cycle T5 in which N is in the WJ stage. If N is resolved to be a not taken branch, then in the next cycle T6 operation continues, and the next instruction N+5 is brought into the PF stage. However, if the branch instruction N is resolved to be a taken branch, then the branch verification apparatus 34 (FIG .1) detects the branch misprediction in clock T5, and flushes the stages including the PF, D1, D2, and Ex stages. In the following cycle T6, a prefetch is initiated to fetch the correct branch target instruction, $N+1_{ACTUAL}$, into the PF stage, and the D1, D2, and Ex stages are empty. The branch instruction N remains in the WJ stage.

Returning to the cycle T1, if it was determined that the address of the instruction N−1 is in the branch target buffer 32, and the branch is predicted to be taken, then the predicted address from the branch target buffer 32 is supplied into the PF stage. The predicted instruction is identified by "$N_{BP}$". At the next clock cycle T2 the prefetch for $N_{BP}$ is initiated in the PF stage. Instructions then proceed sequentially down the pipeline, fetching the next instruction $N_{BP}+1$ in the time cycle T3, and the next instruction $N_{BP}+2$ in the time cycle T4 in which N is in the Ex stage. If the branch prediction is resolved in the Ex stage, and it is a correct prediction, then the PF stage receives the next sequential instruction $N_{BP}+3$ in the cycle T5, and operation continues. If the branch instruction is resolved in the Ex stage, but the branch prediction is not correct, a memory cycle is begun in T5 to supply $N+1_{ACTUAL}$, the instruction at the actual target address, and the stages D1, D2, and Ex will be flushed. In this event, a penalty has been paid for the misprediction. However, following the cycle T4, if N is a branch not resolved in the Ex stage, then operation moves to the FIG. 6B, where the reference numeral "B" designates continued operation.

Reference is now made to FIG. 6B, in which the reference letter "B" indicates the flow of instruction from the lower path of FIG. 6A during the time cycles T5 and T6 that is followed if N is a branch instruction resolvable only in the WJ stage. Pipelined operation continues in clock cycle T5 in which N is in the WJ stage. If the branch prediction is correct, then in the next cycle T6 the next sequential instruction $N_{BP}+4$ is brought into the prefetch stage and execution continues. However, if the branch prediction is incorrect, then during cycle T5, the PF, D1, D2, and Ex stages are flushed. In the following cycle T6, a prefetch is initiated to fetch the correct branch target instruction $N+1_{ACTUAL}$ into the PF stage, and the D1, D2, and Ex stages are empty. The branch instruction N remains in the WJ stage.

Thus, the branch verification hardware has two separate verification methods, depending upon whether the branch is resolved in the Ex stage or the WJ stage. In this context "to resolve" means to determine whether a conditional branch will be taken (thereby altering the control flow), or if the branch will not be taken, letting control flow pass to the next sequential instruction. Conditional branches in the v-pipe can only be resolved in WJ stage since they may be paired with a u-pipe instruction which modifies the flags. All other branches can be resolved in the Ex stage, since the flags could only have been modified by the previous instruction. Unconditional branches and non-branch instructions can also be resolved in the Ex stage, and it is easy to determine whether they are taken or not. For Ex stage resolved branches, the prefetch clock of the branch target overlaps the WJ clock of the branch. For WJ stage resolved branches (i.e., v-pipe conditional branches), the prefetch clock of the target overlaps the WJJ clock of the branch. This optimization affects only the start of misprediction processing; the flush is asserted at the same time for both Ex stage and WJ stage resolved branches.

Figure 7:
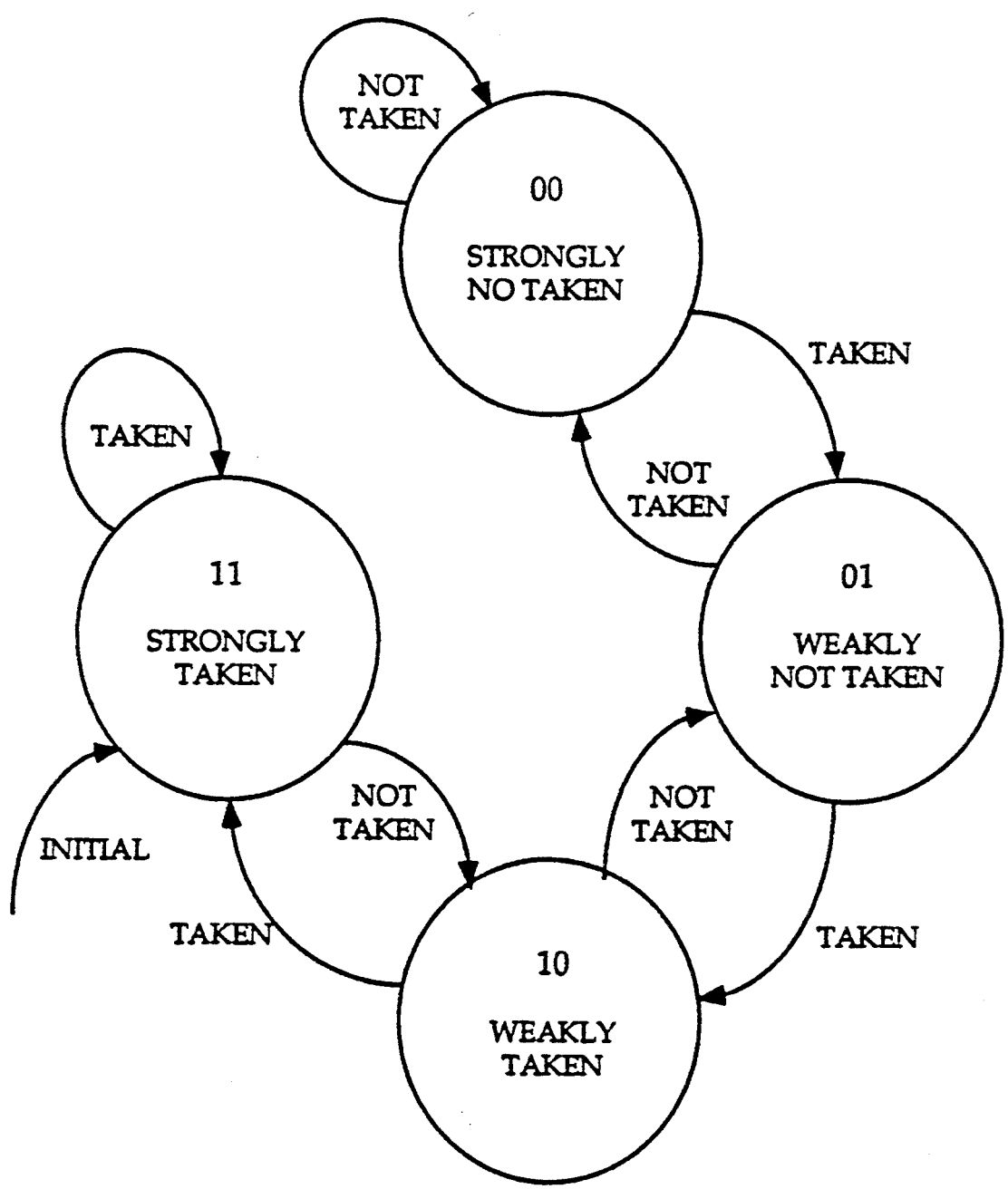
FIG. 7 is a state diagram illustrating operation of the history prediction mechanism in the preferred embodiment.

FIG. 7 is a state diagram of the branch target buffer history bits 42 for each entry in the branch target buffer 32 (FIG. 1) illustrating the history states and how they are selected. The initial entry into the branch target buffer history bits is supplied as illustrated from the bottom of FIG. 7. The initial entry is into state 11, which is the strongly taken state. If the branch is taken in this state, it remains in state 11. However, if from state 11 the branch is not taken, then it moves into the weakly taken state 10. The preferred embodiment of the present invention predicts a branch to be taken if the history bits indicate that the history is weakly taken (state 10) or strongly taken (11). A branch is predicted not taken if the history bits indicate that the history is weakly not taken (state 01) or strongly not taken (state 00).

Thus, within the history bits of each entry in the branch target buffer, a history of the past taken branches in the branch target buffer 32 is maintained. As has been discussed previously, the branch target buffer 32 also associates the linear address of the instruction pair prior to a branch instruction with the linear address of the instruction at the branch target. When a branch is taken and no entry presently exists in the branch target buffer, a new entry is allocated and the history bits are initialized to the strongly taken state 11. As long as the entry remains in the branch target buffer 32, each time the branch is taken the history bits are incremented (not to exceed 11), and each time the branch is not taken the history bits are decremented (not below 00). The branch target buffer is updated when the branch instruction is in the WJ stage.

Since the branch target buffer 32 associates the linear address of the instruction pair prior to the branch with the branch target, the entries placed in the branch target buffer 32 are dependent upon whether one instruction or two are issued. Several exemplary pairings of instructions are shown in the following Appendix A. In each case, the branch target buffer 32 tag is the address of the u-pipe instruction in the instruction pair prior to the branch. Thus, in cases 1 and 3, the tag is the address of the "IMUL" instruction. In cases 2 and 4, the tag is the address of the "ADD" instruction. In all cases, the tagged branch target buffer has stored therein the address of LBL100. To avoid unnecessary interaction between the branch prediction and instruction pairing algorithms, a new entry will not be allocated in the branch target buffer 32 unless the end bit markers are correctly set for both the branch instruction and the instruction pair prior to it (N and N−1, respectively).

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

| | | Appendix A | |
|---|---|---|---|
| | | U-pipe | V-pipe |
| Case 1: | N − 1: | imul ebx,ecx | (empty) |
| | N: | jnz lbl100 | (empty) |
| | N + 1: | lbl100: mov eax,ebx | |
| Case 2: | N − 1: | add esi,10 | cmp eax,2 |
| | N: | jnz lbl100 | (empty) |
| | N + 1: | lbl100: mov eax,ebx | |
| Case 3: | N − 1: | imul ebx,ecx | (empty) |
| | N: | cmp eax,2 | jnz lbl100 |
| | N + 1: | lbl100: mov eax,ebx | |
| Case 4: | N − 1: | add edi,10 | sub esi,10 |
| | N: | cmp eax,2 | jnz lbl100 |
| | N + 1: | lbl100: mov eax,ebx | |

What is claimed is:

1. In a superscalar microprocessor, a computer circuit for predicting the target location of a branch instruction supplied in a sequence of instructions, said computer circuit comprising:

a first and a second pipeline for receiving and processing said sequence of instructions, each pipeline including a decoder including logic to associate said instructions with one of said pipelines, including associating a branch instruction with a non-branch instruction, each of said pipelines also including an execution unit for executing a branch instruction;

a branch target buffer, responsive to instructions in the pipeline for supplying a predicted target address to the pipeline, said branch target buffer including a plurality of entries having a tag field for storing a tag indicative of the address of a first instruction pair immediately preceding a second instruction pair that includes a branch instruction, an address field for storing a target address predicted for the branch instruction, and a history field for storing a history of the takenness of the branch;

a circuit for supplying a current address of an instruction pair in a preselected stage of the pipeline to the branch target buffer; and a circuit for comparing said current address with the address in the tag field.

2. The computer circuit of claim 1 wherein said history field is dual ported for reading and writing in a single clock cycle.

3. The computer circuit of claim 1 further comprising:

a prefetch unit including a first buffer for holding a first line of instruction code and a second buffer for holding a second line of instruction code;

a decoder for receiving instruction code from the prefetch unit; and a means for supplying the contents of a selected one of the buffers to the decoder.

4. The computer circuit of claim 3 further comprising means for predicting a branch to a predicted branch target address in the branch target buffer, and applying an instruction line at said predicted target address to a selected one of said first and second buffers.

5. In a microprocessor having a superscalar architecture including two pipelines, an apparatus for predicting and executing a branch instruction provided in a series of instructions in instruction code lines, said apparatus comprising: a first and a second pipeline for receiving, pairing, and processing said series of instructions, each pipeline including a prefetch stage for fetching and buffering instruction code lines, a decode stage for receiving instruction code lines from the prefetch stage, decoding the instructions in said lines, and issuing said instructions according to pairing rules including pairing a branch instruction with a non-branch instruction and an execution stage, including a circuit for calculating an actual target address from a branch instruction, and a branch target buffer including a plurality of entries having a tag field for storing a tag indicative of a first instruction pair immediately preceding a second instruction pair that includes a branch instruction, an address field for storing a predicted target address, and a history field indicative of a history of the predicted target address;

a multiplexer for selecting an instruction address to be fetched by the prefetch stage, said multiplexer having inputs including a next sequential code line, the predicted target address, and an actual target address; and a branch verification apparatus for comparing an actual target address computed in the execution stage with an address of an instruction following the branch instruction.

6. The apparatus of claim 5 further comprising a writeback stage and, for a conditional branch in the second pipeline, wherein an actual target address is available in said writeback stage, and wherein said branch verification apparatus further comprises circuitry for comparing the actual target address in the writeback stage with the address of an instruction following the branch instruction.

7. The apparatus of claim 5 wherein:

the first pipeline includes circuitry for decoding and executing a first set of instructions in the microprocessor, said first set including a branch instruction;

the second pipeline includes circuitry for decoding and executing a subset of said first set of instructions in the microprocessor, said subset including a branch instruction;

said apparatus further comprises a writeback stage including circuitry for calculating an actual target address from a conditional branch instruction in the second pipeline; and wherein said branch verification apparatus further comprises circuitry for comparing the actual target address computed in the writeback stage with the address of an instruction following the branch instruction.

8. The apparatus of claim 5, wherein the branch verification apparatus further comprises:

circuitry for detecting whether a predicted branch was taken; and circuitry for updating the history field in accordance with whether or not a branch was taken.

9. The apparatus of claim 8 wherein the branch verification apparatus further comprises means, responsive to a taken branch that does not have a tag in the branch target buffer, for creating an entry in the branch target buffer including a tag field including an address corresponding to the address of an instruction pair immediately preceeding the instruction pair that includes the branch instruction, a target address field, and a history field.

10. The apparatus of claim 5 further comprising a code cache for storing instruction code, wherein the instruction code includes instructions whose code length is undetermined until the instruction is in the decoder, and the prefetch stage for each of said first and second pipelines includes two sets of buffers each of which includes a first buffer and a second buffer, either of which can supply instruction code to its respective decoder, so that when a branch is predicted to a target address, the instruction code corresponding to the predicted target address can be loaded by the prefetch stage into either of the buffers without loading the other buffer.

11. The apparatus of claim 5 further comprising a branch prediction control apparatus including selector means, responsive to the history field of a selected entry in the branch target buffer, to select the output of the multiplexer.

12. In a microprocessor having a superscalar architecture, an apparatus for predicting and executing a branch instruction provided in a series of instructions stored in instruction code lines, said apparatus comprising:

a first and a second pipeline for receiving and processing said series of instructions, each pipeline including
- a decode stage for receiving instruction code, decoding the instructions, and issuing said instructions according to pairing rules including pairing a branch instruction with a non-branch instruction,
- an execution stage, including a circuit for calculating an actual target address from a branch instruction, and
- a post-execution stage for writing the results of the execution stage;

a branch target buffer including a plurality of entries having
- a tag field for storing a tag indicative of a first instruction pair immediately preceding a second instruction pair that includes a branch instruction,
- an address field for storing a predicted target address, and
- a history field indicative of a history of the predicted target address; and a branch verification apparatus that verifies branch instructions in the first pipeline in the execution stage and verifies branch instructions in the second pipeline in a post-execution stage.

13. The apparatus of claim 12 wherein the branch verification apparatus verifies unconditional branches in the second pipeline in the execution stage and conditional branches in the second pipeline in the post-execution stage.

14. The apparatus of claim 12 wherein:
the first pipeline includes circuitry for decoding and executing a first set of instructions in the microprocessor, said first set including a branch instruction; and
the second pipeline includes circuitry for decoding and executing a subset of said first set of instructions in the microprocessor, said subset including a branch instruction.

15. The apparatus of claim 12 wherein the tag field of the branch target buffer stores a tag indicative of the address of a first instruction pair immediately preceding a second instruction pair that includes a branch instruction.

* * * * *

UNITED STATES PATENT AND TRADEMARK OFFICE
CERTIFICATE OF CORRECTION

PATENT NO. : 5,442,756
DATED : August 15, 1995
INVENTOR(S) : Grochowski et al.

It is certified that error appears in the above-indentified patent and that said Letters Patent is hereby corrected as shown below:

In column 11 at line 27 delete "dock" and insert --clock--

In column 11 at line 32 delete " "T" " and insert --"I"--

In column 14 at line 45 delete "WI stage." and insert --WJ stage.--

Signed and Sealed this

Seventh Day of January, 1997

Attest:

BRUCE LEHMAN

Attesting Officer        Commissioner of Patents and Trademarks